(12) United States Patent
Okamoto et al.

(10) Patent No.: US 7,508,619 B2
(45) Date of Patent: Mar. 24, 2009

(54) MAGNETIC HEAD AND MAGNETIC DISC DRIVE

(75) Inventors: Hisao Okamoto, Kanagawa (JP); Hideki Zaitsu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 14 days.

(21) Appl. No.: 11/880,236

(22) Filed: Jul. 20, 2007

(65) Prior Publication Data
US 2008/0024900 A1      Jan. 31, 2008

(30) Foreign Application Priority Data
Jul. 20, 2006   (JP)   .............................. 2006-198770

(51) Int. Cl.
G11B 20/20   (2006.01)
G11B 5/265   (2006.01)

(52) U.S. Cl. ........................ 360/76; 360/70; 360/77.02; 360/121

(58) Field of Classification Search ........................ None
See application file for complete search history.

(56) References Cited

U.S. PATENT DOCUMENTS 5,452,166 A * 9/1995 Aylwin et al. .......... 360/125.69
6,987,637 B2 * 1/2006 Litvinov et al. ............... 360/76
2001/0017751 A1 * 8/2001 Miyazaki et al. ............. 360/317
2002/0191343 A1 * 12/2002 Matsuzaki et al. ....... 360/236.6
2004/0042118 A1   3/2004 Notsuke et al.

FOREIGN PATENT DOCUMENTS

JP           2004-094997           3/2004

\* cited by examiner

*Primary Examiner*—Jason C Olson
(74) *Attorney, Agent, or Firm*—Townsend and Townsend and Crew LLP; Rambod Nader

(57) ABSTRACT

Embodiments in accordance with present invention provide a magnetic head and a magnetic disc drive capable of preventing a side erase while providing excellent recording characteristics. According to one embodiment, in order to prevent the side erase in an increased skew angle state, a first magnetic pole surface is formed in such a shape that the projection area of the first magnetic pole surface follows a track edge positioned on the boundary side in the track in the state where the first magnetic pole surface is positioned on the track at the innermost periphery thereof included in a first region. Likewise, to prevent the side erase in the increased skew angle state, a second magnetic pole surface is formed in such a shape that the projection area of the second magnetic pole surface follows a track edge positioned on the boundary side with respect to a track in the state where the second magnetic pole surface is positioned on the track at the outermost periphery thereof included in a second region.

12 Claims, 15 Drawing Sheets

A—A

-- Prior Art --

MAGNETIC HEAD AND MAGNETIC DISC DRIVE

CROSS-REFERENCE TO RELATED APPLICATION

The instant nonprovisional patent application claims priority to Japanese Patent Application No. 2006-198770 filed Jul. 20, 2006 and incorporated by reference in its entirety herein for all purposes.

BACKGROUND OF THE INVENTION

Recently, in the field of a magnetic disc drives, it is required to further improve a recording density of the magnetic disc. In the conventional in-plane magnetic recording system, magnetization is recorded onto a recording surface of the magnetic disc in a parallel direction. On this account, if a recording interval narrows, a thermal fluctuation effect of recording magnetization cannot be ignored. Accordingly, a perpendicular magnetic recording system has been suggested as a method for enabling a higher recording density. Since the magnetization is recorded onto the recording surface of the magnetic disc in a perpendicular direction according to the perpendicular magnetic recording system, the recording magnetization is rarely affected by the thermal fluctuation effect. Therefore, the recording interval of the magnetization can be narrowed.

A magnetic head adopting the perpendicular magnetic recording system is called a single pole head. In such a single pole head, the magnetization is recorded onto the recording surface of the magnetic disc in a perpendicular direction by using a main pole having a magnetic pole surface which is opposed to the recording surface of the magnetic disc so as to emit a record magnetic field onto the recording surface.

Since the magnetic head rotates over the recording surface of the magnetic disc substantially along the radius direction of the magnetic disc in the state where the magnetic head is held by a distal end of a head assembly, the direction of the magnetic head is often inclined with respect to the direction of a track (hereinafter, the angle of such an inclination is simply referred as a skew angle). Here, the direction of the magnetic head refers to the rotational radius direction of rotation movement.

FIG. 15 is an explanatory diagram illustrating a state of the magnetic pole surface disposed on a track formed on the recording surface (the conventional example). As shown in the drawing, among tracks formed on the recording surface, in a track 102A where the skew angle becomes zero, a magnetic pole surface 101 is included in the width of the track 102A. On the other hand, in a track 102B where the skew angle increases, a magnetic pole surface 101 is not included in the width of a track 102B. In this way, when the recoding is performed in the state where the magnetic pole surface 101 is not included in the width of the track 102B, boundary portions between adjacent tracks are magnetized to cause noise at the time of a reproducing process, or the adjacent tracks themselves are magnetized to cause a data erase (hereinafter, such a phenomenon is referred to as a side erase).

In Japanese Patent Publication No. 2004-94997 ("Patent Document 1"), there is disclosed a technology in which the side erase is prevented by modifying the shape of the magnetic pole surface of the main pole. However, according to the technology, in order to prevent the side erase in the entire tracks included in the recording surface, the profile of the magnetic pole surface is excessively decreased. As a result, it is impossible to secure the amount of a record magnetic field generated by the magnetic pole surface to a sufficient level, thereby deteriorating recording characteristics.

BRIEF SUMMARY OF THE INVENTION

Embodiments in accordance with the present invention provide a magnetic head and a magnetic disc drive capable of preventing a side erase while providing excellent recording characteristics. According to the particular embodiment of FIG. 5, to prevent the side erase in the increased skew angle state, the first magnetic pole surface 21A is formed in such a shape that the projection area of the first magnetic pole surface 21A follows a track edge 415A positioned on the boundary 43 side in the track 41A in the state where the first magnetic pole surface 21A is positioned on the track 41A at the innermost periphery thereof included in the first region 45A. Likewise, to prevent the side erase in the increased skew angle state, the second magnetic pole surface 21B is formed in such a shape that the projection area of the second magnetic pole surface 21B follows a track edge 413B positioned on the boundary 43 side with respect to a track 41B in the state where the second magnetic pole surface 21B is positioned on the track 41B at the outermost periphery thereof included in the second region 45B.

DETAILED DESCRIPTION OF THE INVENTION

Figure 1:
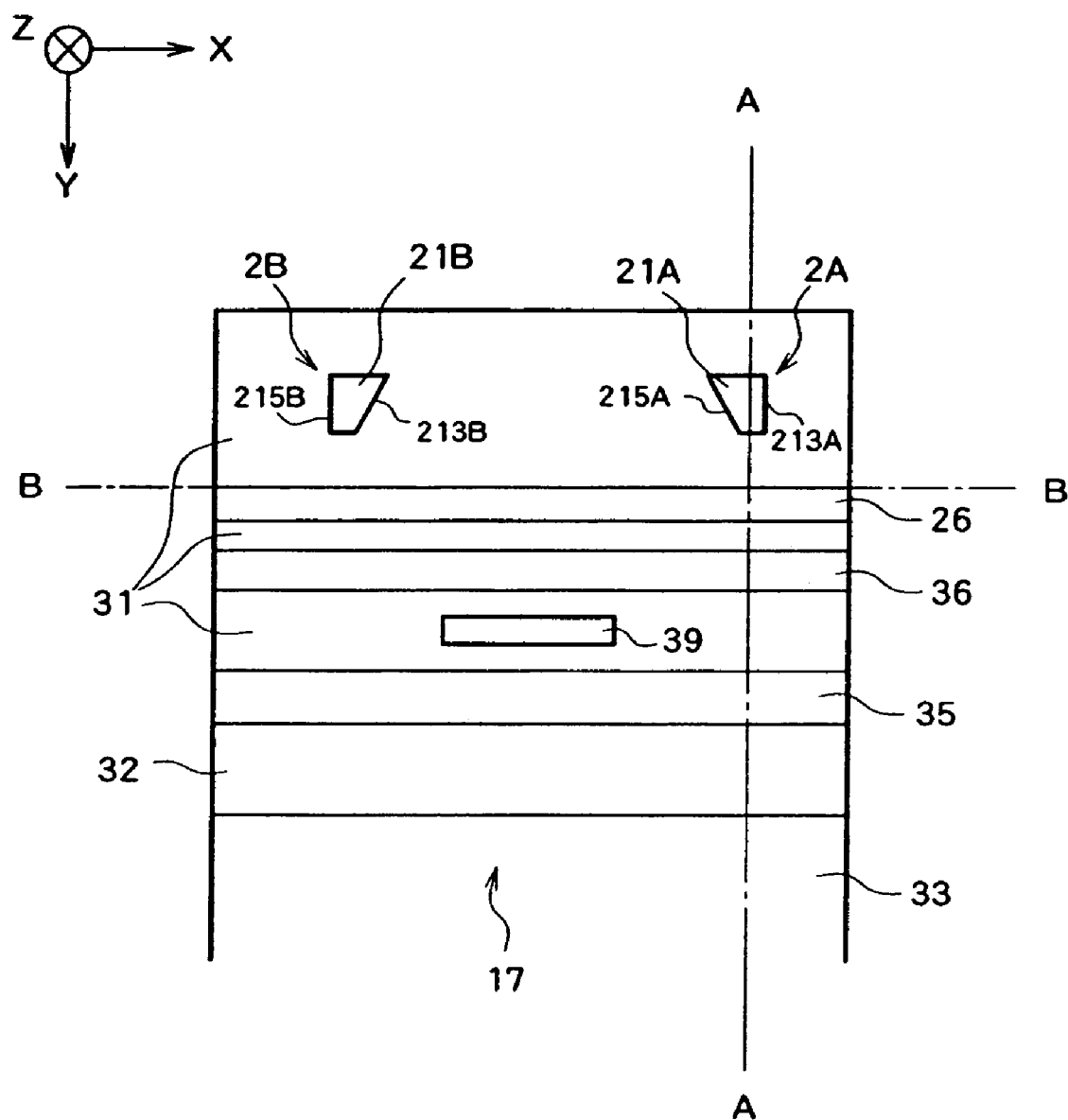
FIG. 1 is a diagram illustrating an air-bearing surface of a magnetic head (a first embodiment).

Embodiments in accordance with the present invention relate to a magnetic head and a magnetic disc drive using the same, which employs a perpendicular magnetic recording system in a magnetic disc drive such as a hard disk drive (HDD).

Embodiments of the present invention have been made in consideration of the above-mentioned problems, and an object of embodiments according to the present invention is to provide a magnetic head and a magnetic disc drive capable of preventing a side erase while providing excellent recording characteristics.

To solve the above-mentioned problems, in accordance with embodiments of the invention, there is provided a magnetic head which moves over a recording surface of a magnetic disc in a flying manner, rotates about a rotation axis defined outside the magnetic disc, and records data onto the recording surface along tracks formed on the recording surface, wherein the magnetic head includes a first write element formed in such a shape that a projection area of a magnetic pole surface which is opposed to the recording surface so as to emit a record magnetic field onto the recording surface does not cross over both track edges of the track included in a first region among the first region and a second region partitioned concentrically on the recording surface in the state where the first write element is positioned on the track included in the first region; and a second write element formed in such a shape that a projection area of a magnetic pole surface which is opposed to the recording surface so as to emit a record magnetic field onto the recording surface does not cross over both track edges of the track included in the second region in the state where the second write element is positioned on the track included in the second region.

The magnetic head in accordance with embodiments of the present invention is characterized in that on the recording surface, an inner peripheral side of a track which forms a skew angle of zero along with the magnetic head in the recording surface is defined as the first region and an outer peripheral side of the track is defined as the second region.

The magnetic head in accordance with embodiments of the present invention is characterized in that the recording surface further includes a third region in addition to the first region and the second region, and the magnetic head further includes a third write element formed in such a shape that a projection area of a magnetic pole surface which is opposed to the recording surface so as to emit a record magnetic field onto the recording surface does not cross over both track edges of the track included in the third region in the state where the third write element is positioned on the track included in the third region.

According to embodiments of the present invention, there is also provided a magnetic disc drive which includes the above-mentioned magnetic head; the above-mentioned magnetic disc; a control circuit for moving the magnetic head to a target record position of data on the recording surface of the magnetic disc; and an output switch circuit outputting a signal for recording data to the first write element when the target record position is in the first region and outputting a signal for recording data to the second write element when the target record position is in the second region.

A magnetic disc drive in accordance with embodiments of the present invention is characterized in that when outputting a signal for recording data to one write element of the first write element and the second write element, the output switch circuit outputs to the other write element a signal for generating a magnetic field in a direction of canceling a magnetic field which is generated from a coil included in the one write element and acts on a coil included in the other write element.

A magnetic disc drive in accordance with embodiments of the invention is characterized in that when a position of the magnetic head is changed between the first region and the second region, the control circuit adds or subtracts an offset value for correcting an inclination in the track width direction due to a position difference between a magnetic pole surface of the first write element and a magnetic pole surface of the second write element, to or from a control signal for moving the magnetic head.

According to embodiments of the present invention, it is possible to prevent a side erase phenomenon while providing excellent recording characteristics.

Hereinafter, embodiments of a magnetic head and a magnetic disc drive according to the present invention will be described with reference to the drawings. In the case where common elements exist in the embodiments, those elements will be referenced by the same reference numerals and detailed description thereof will be omitted.

Figure 2:
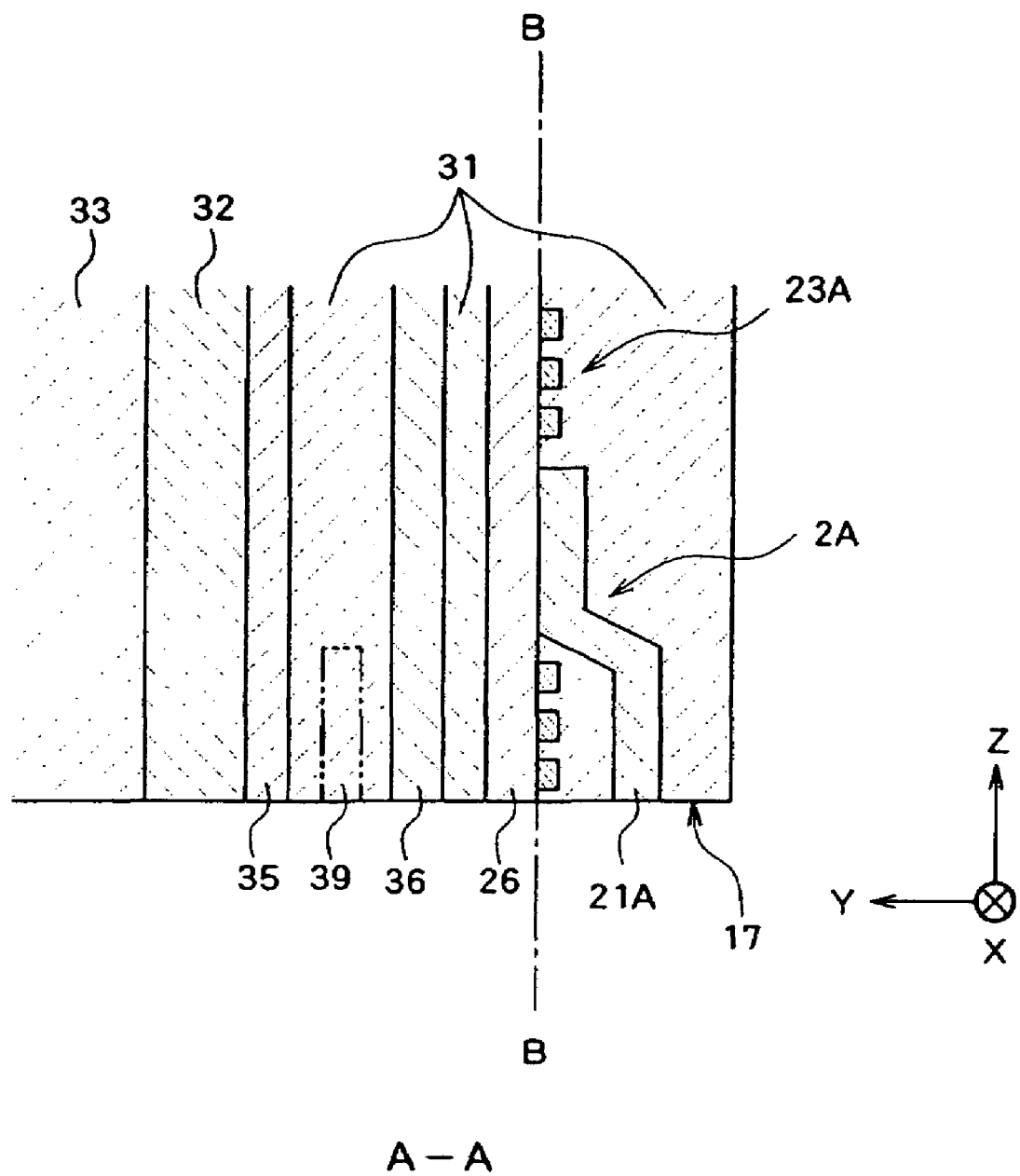
FIG. 2 is a schematic diagram illustrating a sectional structure of the YZ plane of the magnetic head (the first embodiment).
Figure 3:
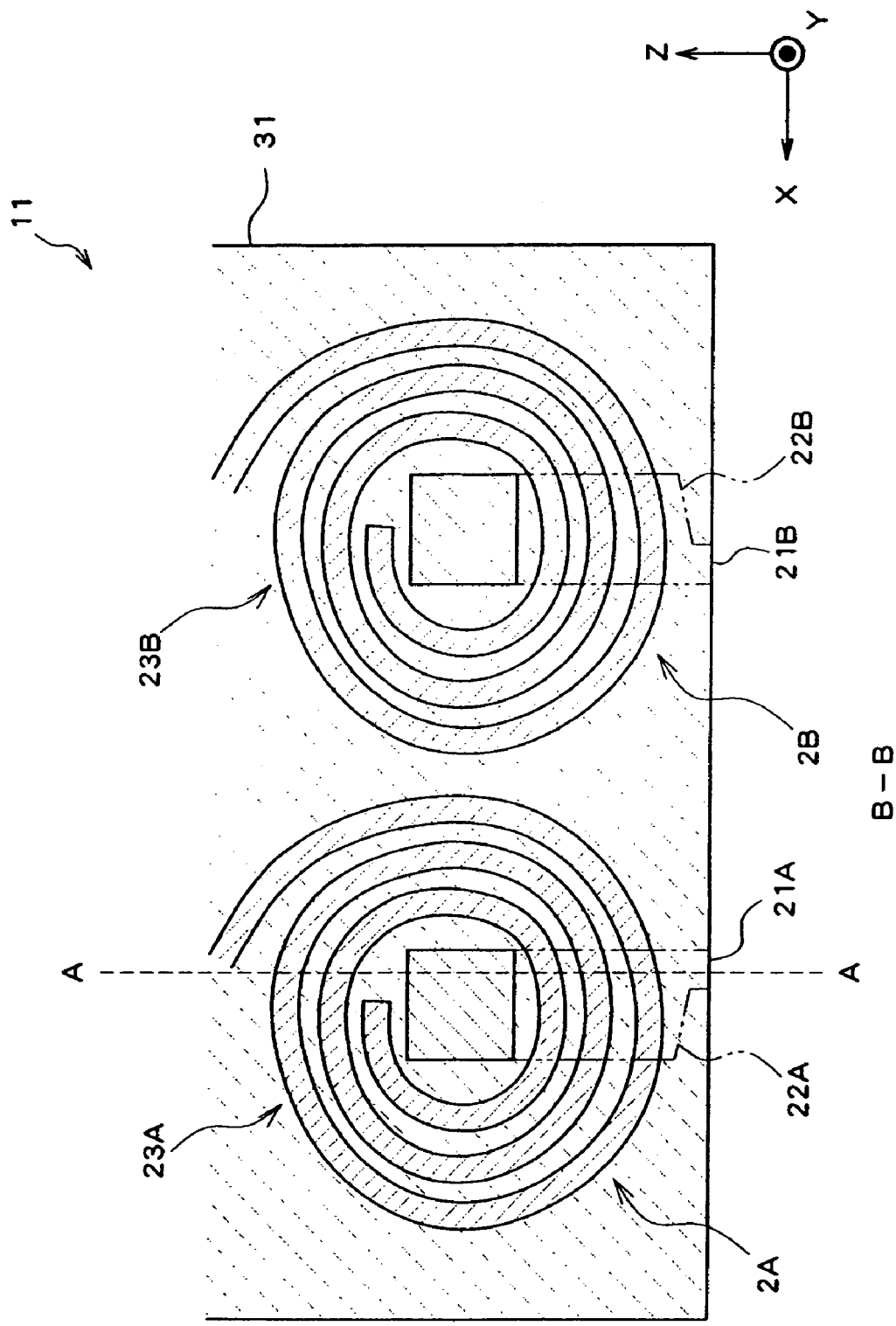
FIG. 3 is a schematic diagram illustrating a sectional structure of the XZ plane of the magnetic head in a first embodiment.

Hereinafter, a first embodiment of a magnetic head will be described. FIG. 1 is a diagram illustrating an air-bearing surface 17 (the surface opposed to a recording surface of a magnetic disc) of a magnetic head 11. FIG. 2 is a sectional view taken along the A-A line in FIG. 1. FIG. 3 is a sectional view taken along the B-B line in FIG. 1. Here, the Y direction is a rotational radius direction when the magnetic head 11 is rotated and the positive direction thereof is a direction toward the rotation axis. The Z direction is a direction perpendicular to the recording surface of the magnetic disc and the positive direction thereof is a direction of the flying movement of the magnetic head 11.

The magnetic head 11 is configured as a thin film magnetic head adopting a perpendicular magnetic recording system. As shown in FIG. 4, the magnetic head 11 is attached onto the slider 91 and is rotated substantially along the radius direction of the recording surface in the state where the magnetic head 11 moves over the recording surface of a magnetic disc 4 in a flying manner by the action of a voice coil motor 93 driving a head assembly 92 holding the slider 91.

The magnetic head 11 has a layer structure as follows. Here, an upper side is defined as a lamination direction in the layer structure, that is, the negative Y direction side. An underlying layer 32 is formed on a substrate 33 attached to the slider 91. A read element 39 is disposed on the underlying layer 32 sandwiched by two layers of read shield layers 35 and 36. The read element 39 is constituted by elements such as GMR elements for reproducing data recorded on the recording surface of the magnetic disc, and is disposed so as to be exposed to the air-bearing surface 17. Additionally, a return pole layer 26 is disposed on the upper read shield layer 36. A first write element 2A and a second write element 2B are provided on the same layer in the return pole layer 26 (the write elements are arranged in the X direction). The positional relationship between the first write element 2A and the second write element 2B in the X direction may be arbitrarily chosen. The first write element 2A and the second write element 2B each is an element for recording data onto the recording surface of the magnetic disc, and detailed configurations thereof will be described later. Incidentally, intermediate layers 31 are filled into those gaps between the above-mentioned layers. The underlying layer 32 and the intermediate layers 31 are made of ceramics such as alumina.

The first write element 2A includes a first main pole 22A having a first main pole surface 21A exposed to the air-bearing surface 17 and a first coil 23A. As shown in FIG. 2, the first main pole 22A is formed into a line shape bent like a crank shape on the YZ plane, and one end thereof is attached onto the return pole layer 26. The first main pole surface 21A is formed on the other end thereof, and the other end is formed into a shape narrowed toward the first magnetic pole surface 21A on the XZ plane, as shown in FIG. 3. The first coil 23A is formed in a spiral shape surrounding the end attached onto the return pole layer 26 of the first main pole 22A. The first coil 23A receives an electrical signal representing target record data from the outside and applies a record magnetic field to the first main pole 22A. Specifically, the record magnetic field is applied to the recording surface of the magnetic disc in a perpendicular direction from the first magnetic pole surface 21A of the first main pole 22A. The second write element 2B includes a second main pole 22B having the second magnetic pole surface 21B exposed to the air-bearing surface 17 and a second coil 23B. The shape and function of the second write element 2B are the same as those of the first write element 2A.

The return pole layer 26 is an arrival layer of the record magnetic field which has been applied to the recording surface of the magnetic disc in a perpendicular direction from the first magnetic pole surface 21A of the first main pole 22A and from the second magnetic pole surface 21B of the second main pole 22B and has passed through the inside of the magnetic disc as a U turn shape. Since the return pole layer 26 is functioning as a magnetic barrier, the read shield layer 36 may be omitted. In the embodiment, the first main pole 22A and the second main pole 22B are attached onto the same return pole layer 26, and the magnetic head 11 is formed into a simplified layer structure.

FIG. 4 is an explanatory diagram illustrating the magnetic head 11 rotated on the recording surface of the magnetic disc 4. The magnetic head 11 is rotated on the recording surface of the magnetic disc 4 rotating in a disk rotation direction DR, while rotating about a rotation axis AP of the voice coil motor 93 along a locus RM in substantially the radius direction of the magnetic disc 4. A plurality of tracks which have the same center axis as that of a disk rotation direction DR are arranged on the recording surface of the magnetic disc 4 in the radius direction of the magnetic disc 4.

Figure 4A:
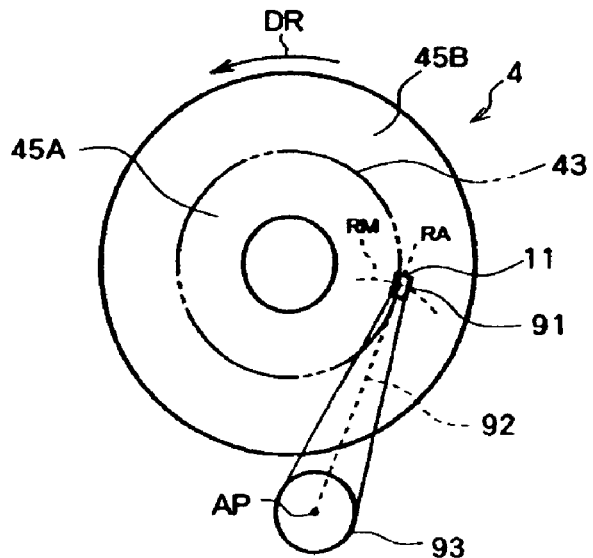
FIGS. 4(a)-4(c) are diagrams illustrating the magnetic head rotated on a recording surface of the magnetic disc.
Figure 4B:
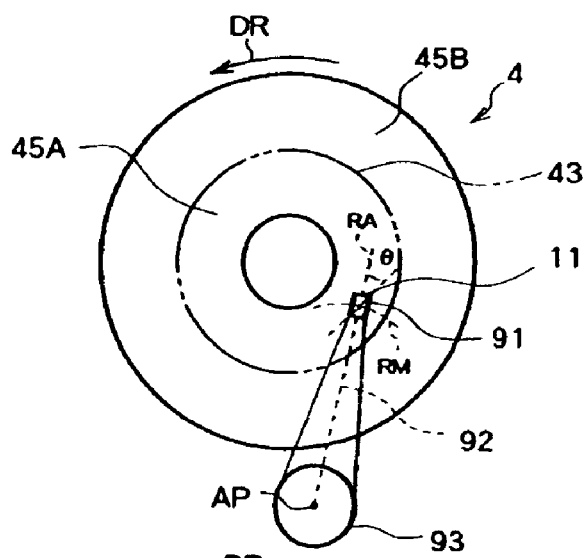
Figure 4C:
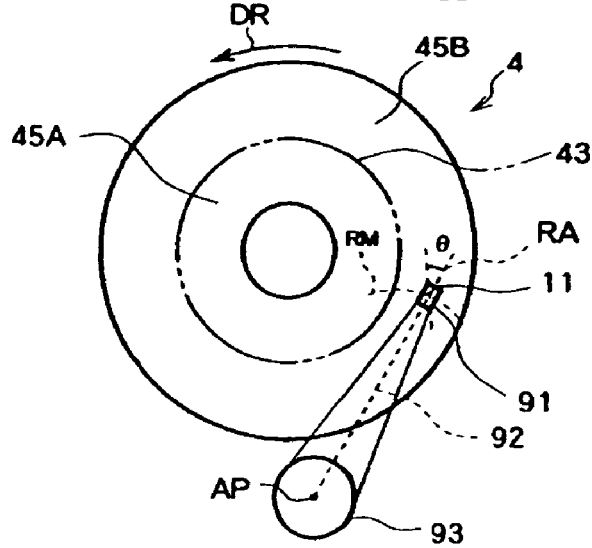

As shown in FIG. 4(a), the magnetic head 11 is rotated along the locus RM on which a skew angle does not occur with respect to track when the magnetic head is positioned on a middle position in the radius direction of the magnetic disc 4. Here, the skew angle represents an inclination of the movement direction (the rotational radius direction RA) of the magnetic head 11 with respect to a track direction (the disk rotation direction DR). On the other hand, in the case where the magnetic head 11 is positioned on the inner peripheral side relative to the middle position as shown in FIG. 4(b) or the magnetic head 11 is positioned on the outer peripheral side than the middle position as shown in FIG. 4(c), the skew angle 0 is formed between the movement direction of the magnetic head 11 and the track direction.

As shown in FIG. 4(a), assuming that a track position on the recording surface of the magnetic disc 4 on which the magnetic head 11 does not make a skew angle is a boundary 43, an inner peripheral side relative to the boundary 43 is defined as a first region 45A and an outer peripheral side than the boundary 43 is defined as a second region 45B. In this way, the first region 45A and the second region 45B are both formed into a ring shaped region which is partitioned by the boundary 43 into a concentric shape. The boundary 43 is not a real element formed on the recording surface of the magnetic disc 4, but a virtual element. Whether it is the first region 45A or the second region 45B is judged by a device on the basis of servo data (position data) which is read from the recording surface of the magnetic disc 4, which will be described later.

In the above-mentioned magnetic head 11, the first write element 2A of which the first magnetic pole surface 21A is exposed to the air-bearing surface 17 is used to record data onto the track included in the first region 45A. The second write element 2B of which the second magnetic pole surface 21B is exposed to the air-bearing surface 17 is used to record data onto the track included in the second region 45B.

Figure 5:
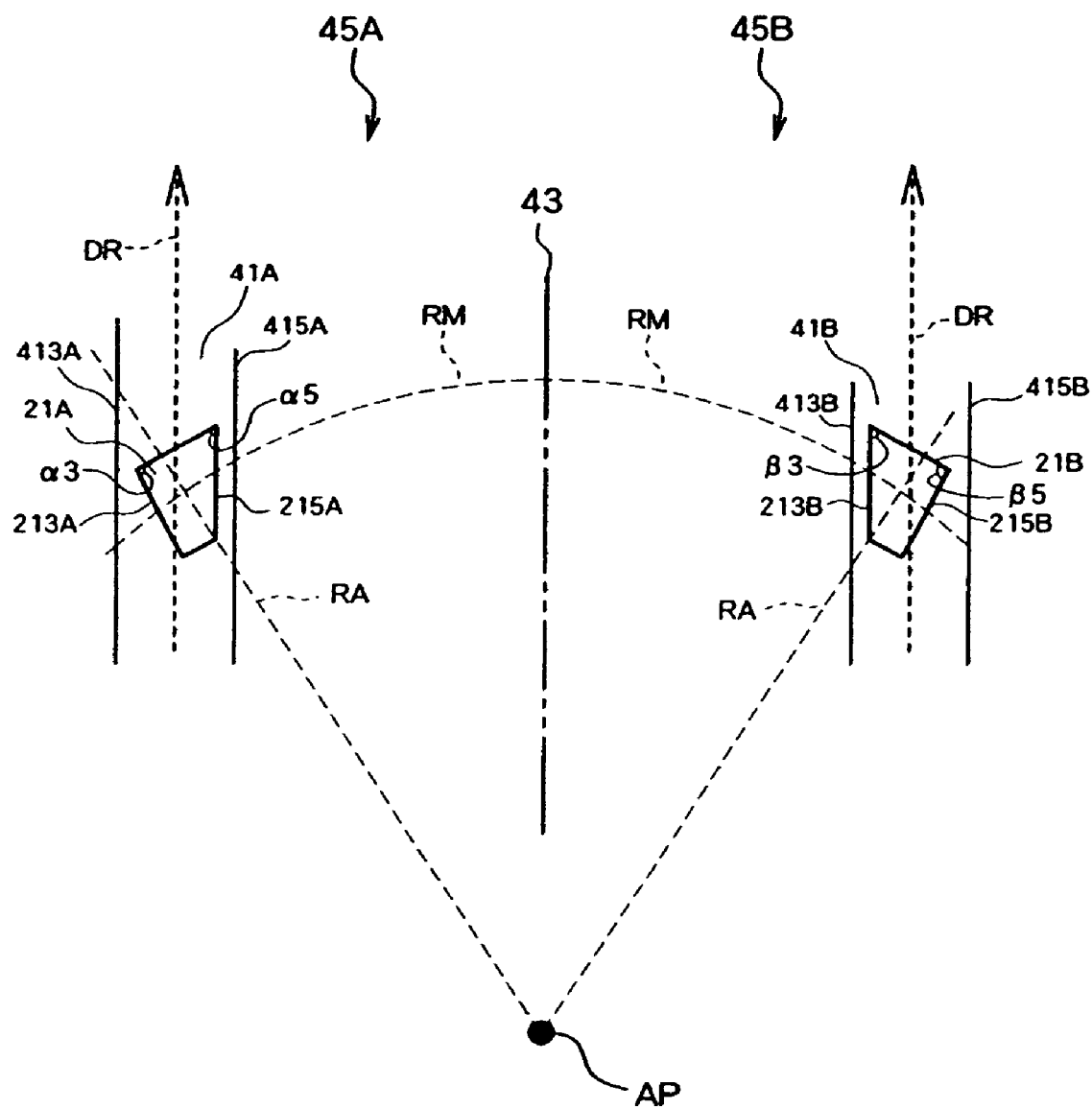
FIG. 5 is a diagram illustrating a relationship between a magnetic pole surface and a track when the magnetic head (the first embodiment) rotated on the recording surface of the magnetic disc.

FIG. 5 is an explanatory diagram illustrating a relationship between the track included in the first region 45A and the first magnetic pole surface 21A (a left side of the boundary 43) and a relationship between the track included in the second region 45B and the second magnetic pole surface 21B (a right side of the boundary 43), when the magnetic head 11 is rotated on the recording surface of the magnetic disc 4. In the drawings, there are shown projection areas of the first magnetic pole surface 21A and the second magnetic pole surface 21B which are projected in a perpendicular direction (the Z direction) with respect to the recording surface of magnetic disc 4.

The first magnetic pole surface 21A is formed in such a shape that the projection area of the first magnetic pole surface 21A does not depart from the track, that is, does not cross over both track edges of the track in the state where the first magnetic pole surface 21A is positioned on respective tracks so as to prevent the side erase on the tracks included in the first region 45A.

Figure 6:
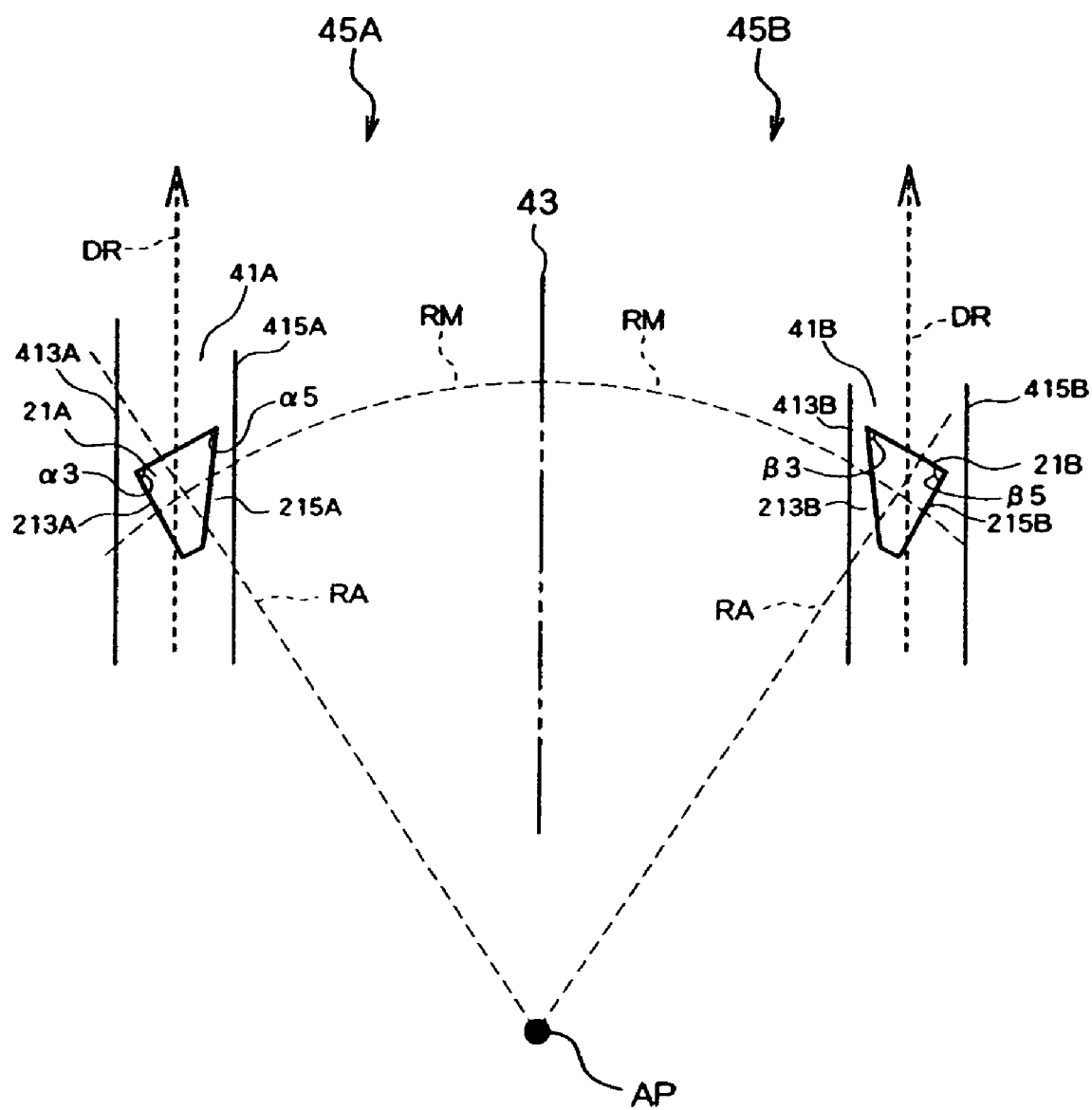
FIG. 6 is a diagram illustrating a modified example of FIG. 5.

Specifically, to prevent the side erase in the increased skew angle state and secure the magnetic pole area to a sufficient level, the first magnetic pole surface 21A is formed in such a shape that the projection area of the first magnetic pole surface 21A follows a track edge 415A positioned on the boundary 43 side in the track 41A in the state where the first magnetic pole surface 21A is positioned on the track 41A at the innermost periphery thereof included in the first region 45A. That is, a side 215A of the first magnetic pole surface 21A opposed to the boundary 43 is formed in the shape following the track edge 415A. Here, the definition of "the shape following the track edge 415A" includes not only a shape completely parallel to the track edge 415A, but also a shape forming a slight angle with respect to the track edge 415A. For example, as shown in FIG. 6, the side 215A of the first magnetic pole surface 21A opposed to the boundary 43 may be formed in a taper shape toward a rear side (the rotation axis AP side) of the disk rotation direction DR. In this case, it is possible to suppress an increase in the record magnetic field emitted from the first magnetic pole surface 21A.

The first magnetic pole surface 21A has a trapezoid shape in which a side close to the rotation axis AP is a shorter side and a side far from the rotation axis is a longer side. An angle α5 of the boundary 43 side (a side closer to the position where the skew angle becomes zero) among angles α3 and α5 formed on both ends of the longer side is smaller than the angle α3 in the opposite side.

Likewise, the second magnetic pole surface 21B is formed in such a shape that the projection area of the second magnetic pole surface 21B does not cross over both track edges of the track in the state where the second magnetic pole surface 21B is positioned on the respective tracks included in the second region 45B. Specifically, the second magnetic pole surface 21B is formed in such a shape that the projection area of the second magnetic pole surface 21B follows a track edge 413B positioned on the boundary 43 side with respect to a track 41B in the state where the second magnetic pole surface 21B is positioned on the track 41B at the outermost periphery thereof included in the second region 45B. That is, a side 213B of the second magnetic pole surface 21B opposed to the boundary 43 is formed in the shape following the track edge 413B. Here, in the same manner as the first magnetic pole surface 21A, the definition of "the shape following the track edge 413B" includes not only a shape completely parallel to the track edge 413B, but also a shape forming a slight angle with respect to the track edge 413B. In the second magnetic pole surface 21B, an angle β3 of the boundary 43 side (a side closer to the position where the skew angle becomes zero) among angles β3 and β5 formed on both ends of the longer side is smaller than the angle β5 in the opposite side.

In this way, since the magnetic pole surfaces are formed in such a shape that only a part of one side thereof is cut out from a rectangle so that the side erase does not occur in the regions 45A and 45B formed by the respective magnetic pole surfaces 21A and 21B, an area of the magnetic pole surfaces 21A and 21B can be secured to a sufficient level as compared with the magnetic pole surface disclosed in Patent Document 1.

To prevent the side erase, it is preferable that the magnetic pole surfaces 21A and 21B as described above are formed to correspond to the shapes of the innermost peripheral track 41A and the outermost peripheral track 41B respectively where the skew angle extremely increases. However, the shape is not limited to this, and the magnetic pole surface may be formed to correspond to the shape of the track where the skew angle decreases, for example the track which is positioned in the vicinity of the innermost peripheral track 41A and the outermost peripheral track 41B or positioned in the middle of the respective regions.

A modified example of the magnetic pole surface will be described. Unlike the case where the position of the magnetic head 11 where the skew angle is not formed is set in the middle position in the radius direction of the magnetic disc 4 as shown in FIG. 5, FIG. 7 is a diagram illustrating a relationship between the magnetic pole surface and the track when the position of the magnetic head 11 where the skew angle is not formed is set on the inner peripheral side or the outer peripheral side of the magnetic disc 4. The drawing illustrates the projection area projecting the magnetic pole surface in a direction perpendicular to the recording surface of magnetic disc 4 (Z direction).

Figure 7A:
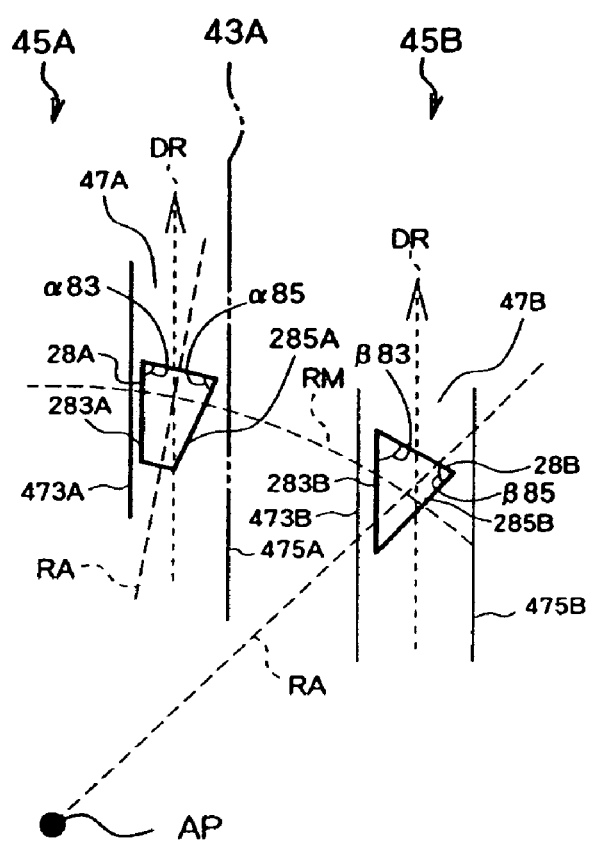
FIGS. 7(a) and 7(b) are diagrams illustrating a relationship between a magnetic pole surface and a track when a magnetic head (the modified example of the first embodiment) rotated on a recording surface of a magnetic disc.

FIG. 7(a) illustrates the case where the position of the magnetic head 11 where the skew angle is not formed is disposed on the innermost peripheral track position of the magnetic disc. A boundary 43A is set on any position in the radius direction of the magnetic disc 4. In this case, a first magnetic pole surface 28A has a shape following a track edge 473A of the inner peripheral side of a track 47A in the state where the first magnetic pole surface 28A is positioned on the track 47A at the outermost periphery thereof where the skew angle extremely increases in the first region 45A. To clarify, a side 283A which is an inner peripheral side of the first magnetic pole surface 28A is formed in a shape following the track edge 473A. In the first magnetic pole surface 28A, an angle α83 close to a position where the skew angle is formed to be zero between angles α83 and α85 which are formed on the both ends of the longer side is smaller than the angle α85 opposite thereto. Additionally, a second magnetic pole surface 28B has a shape following a track edge 473B of the inner peripheral side of a track 47B in the state where the second magnetic pole surface 28B is positioned on the outermost peripheral track 47B where the skew angle extremely increases in the second region 45B. To clarify, a side 283B which is an inner peripheral side of the second magnetic pole surface 28B is formed in a shape following the track edge 473B. In the second magnetic pole surface 28B, an angle β83 close to a position where the skew angle is formed to be zero between angles β83 and β85 which are formed on the both ends of the longer side is smaller than the angle β85 opposite thereto.

In this way, since the position of the magnetic head 11 where the skew angle is not formed is disposed on the innermost peripheral track position of the magnetic disc, each of the first magnetic pole surface 28A and the second magnetic pole surface 28B is formed in a shape that the same side as the rotational radius direction RA which exists on center (the inner peripheral side) is cut off. Because the skew angle in the second region 45B becomes larger than the skew angle in the first region 45A, the second magnetic pole surface 28B is formed in a taper shape toward a direction of the rotation axis AP with respect to the first magnetic pole surface 28A. In other words, it is possible to sufficiently secure the area of the first magnetic pole surface 28A forming the first region 45A where the skew angle decreases.

Figure 7B:
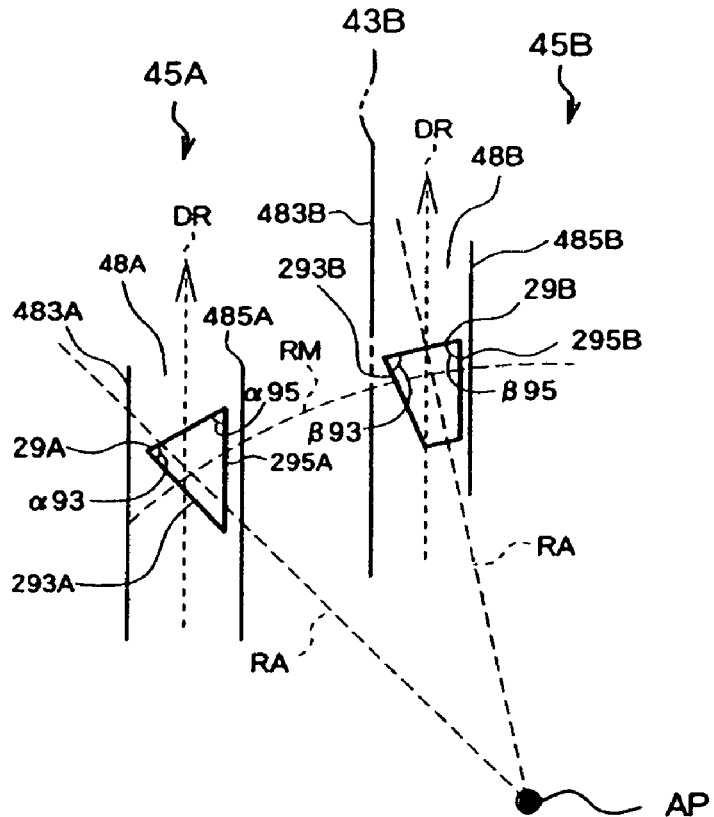

FIG. 7b illustrates the case where the position of the magnetic head 11 where the skew angle is not formed is disposed on the outermost peripheral track position of the magnetic disc. A boundary 43B is set on any position in the radius direction of the magnetic disc 4. In this case, a first magnetic pole surface 29A has a shape following a track edge 485A of the outer peripheral side of a track 48A in the state where the magnetic pole surface 29A is positioned on the innermost peripheral track 48A where the skew angle extremely increases in the first region 45A. To clarify, a side 295A which is an outer peripheral side of the first magnetic pole surface 29A is formed in a shape following the track edge 485A. In the first magnetic pole surface 29A, an angle α95 close to a position where the skew angle is formed to be zero between angles α93 and α95 which are formed on the both ends of the longer side is smaller than the angle α93 opposite thereto. Additionally, a second magnetic pole surface 29B has a shape following a track edge 485B of the outer peripheral side of a track 48B in the state where the magnetic pole surface 29B is positioned on the innermost peripheral track 48B where the skew angle extremely increases in the second region 45B. To clarify, a side 295B which is an outer peripheral side of the second magnetic pole surface 29B is formed in a shape following the track edge 485B. In the second magnetic pole surface 29B, an angle β95 close to a position where the skew angle is formed to be zero between angles β93 and β95 which are formed on the both ends of the longer side is smaller than the angle β93 opposite thereto.

In this way, since the position of the magnetic head 11 where the skew angle is not formed is disposed on the outermost peripheral track position of the magnetic disc, each of the first magnetic pole surface 29A and the second magnetic pole surface 29B is formed in a shape that the same side as the rotational radius direction RA which exists on center (the outer peripheral side) is cut off. Because the skew angle in the first region 45A becomes larger than the skew angle in the second region 45B, the first magnetic pole surface 29A is formed in a taper shape toward a direction of the rotation axis AP with respect to the second magnetic pole surface 29B. In other words, it is possible to sufficiently secure the area of second magnetic pole surface 29B forming the second region 45B where the skew angle decreases.

Figure 8:
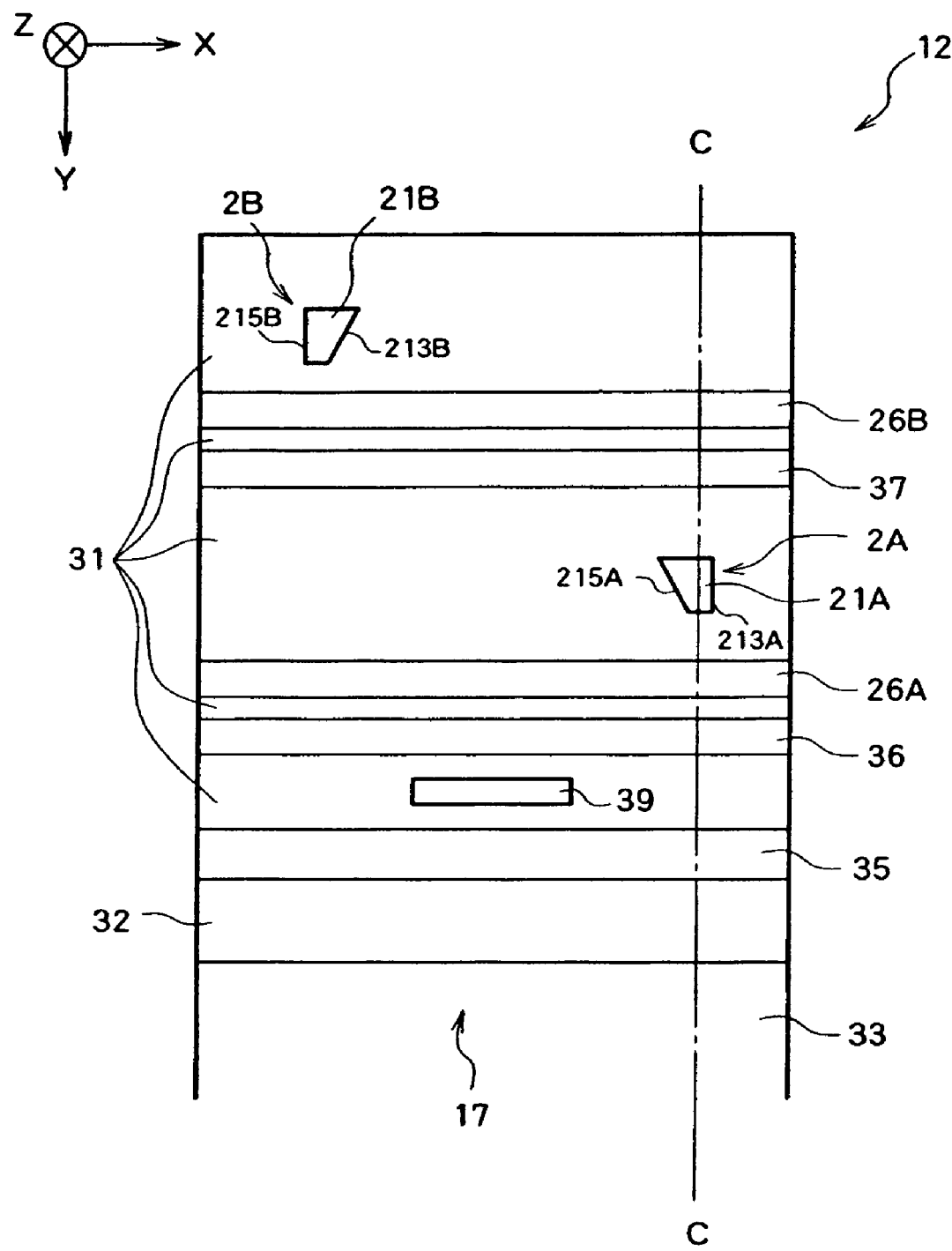
FIG. 8 is a diagram illustrating an air-bearing surface of a magnetic head according to a second embodiment.
Figure 9:
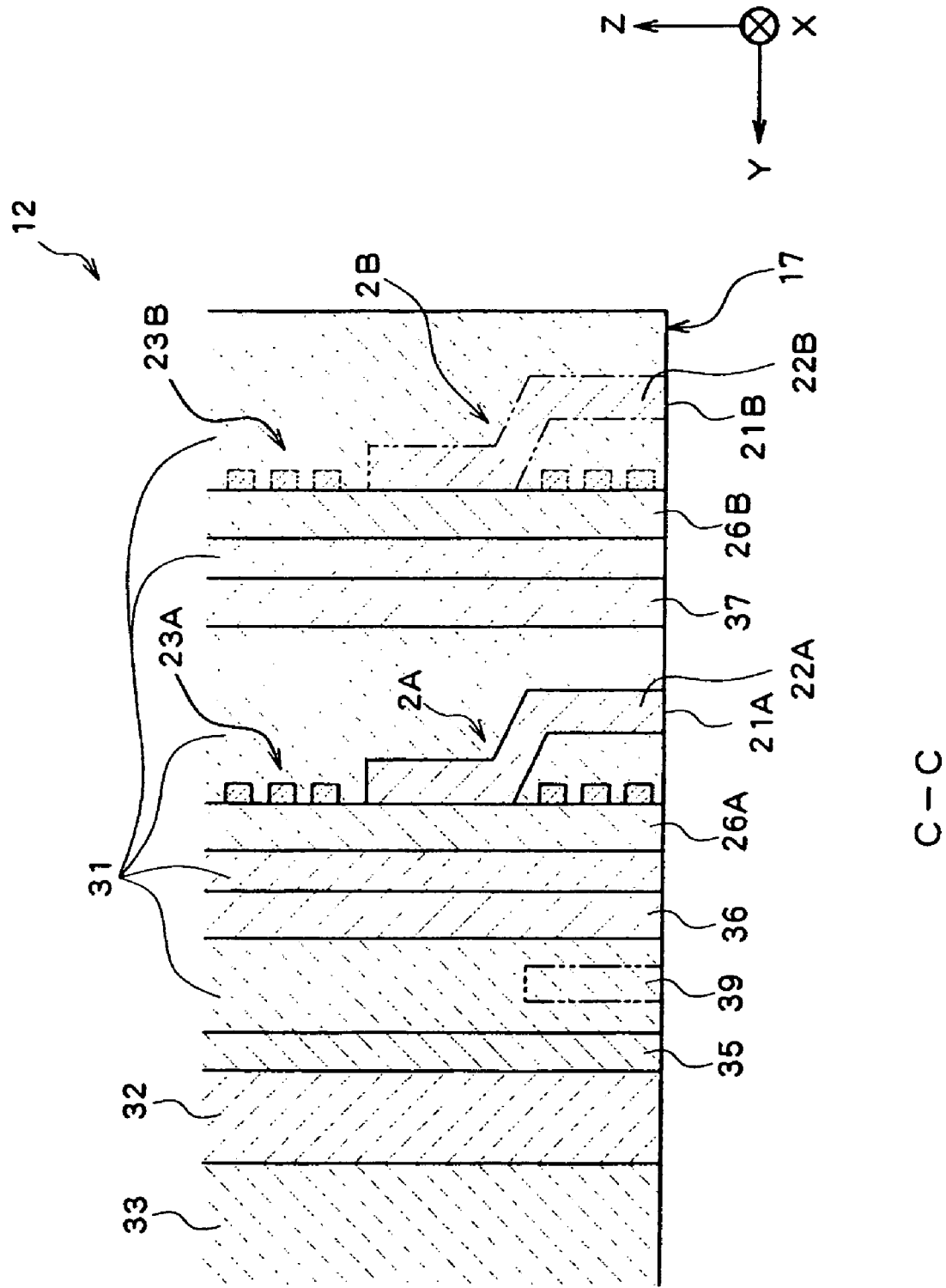
FIG. 9 is a schematic diagram illustrating a sectional structure of the YZ plane of the magnetic head in the second embodiment.

A second embodiment of a magnetic head will now be described. FIG. 8 illustrates an air-bearing surface 17 (the surface faces to a recording surface of a magnetic disc) of a magnetic head 12. FIG. 9 is a sectional view taken along the C-C line in FIG. 8.

In the magnetic head 12, a first write element 2A and a second write element 2B are disposed on layers different from each other (the write elements are arranged in the Y direction). Here, an upper side is defined as a lamination direction in the layer structure, that is, the negative Y direction. On a read shield layer 36, a return pole layer 26A is disposed, and the first write element 2A is provided on the return pole layer 26A. A return pole layer 26B is also disposed thereon with a read shield layer 37 interposed therebetween. The second write element 2B is provided on the return pole layer 26B. The first write element 2A and the second write element 2B in both the X direction and the Y direction may be arbitrarily chosen. Additionally, since the return pole layers 26A and 26B also function as the magnetic barrier, the read shield layers 36 and 37 may be omitted.

In the embodiment, the first write element 2A and second write element 2B are disposed with the read shield layer 37 (when the read shield layer 37 is removed, the return pole layer 26B becomes instead thereof) interposed therebetween. Therefore, when any one coil of a first coil 23A and a second coil 23B generates a magnetic field for a recording, it is possible to reduce the affection about the other coil.

In the magnetic head 12, the first magnetic pole surface 21A included in the first write element 2A and the second magnetic pole surface 21B included in the second write element 2B are formed in the same shape as the magnetic head 11 according to the first embodiment as shown in FIG. 5 mentioned above. In FIG. 5, since the first write element 2A and second write element 2B are disposed on the different layers (the write elements are arranged in the Y direction), the first magnetic pole surface 21A and the second magnetic pole surface 21B are formed to have a difference corresponding to a gap of the layers to the position of the rotational radius direction RA.

Figure 10:
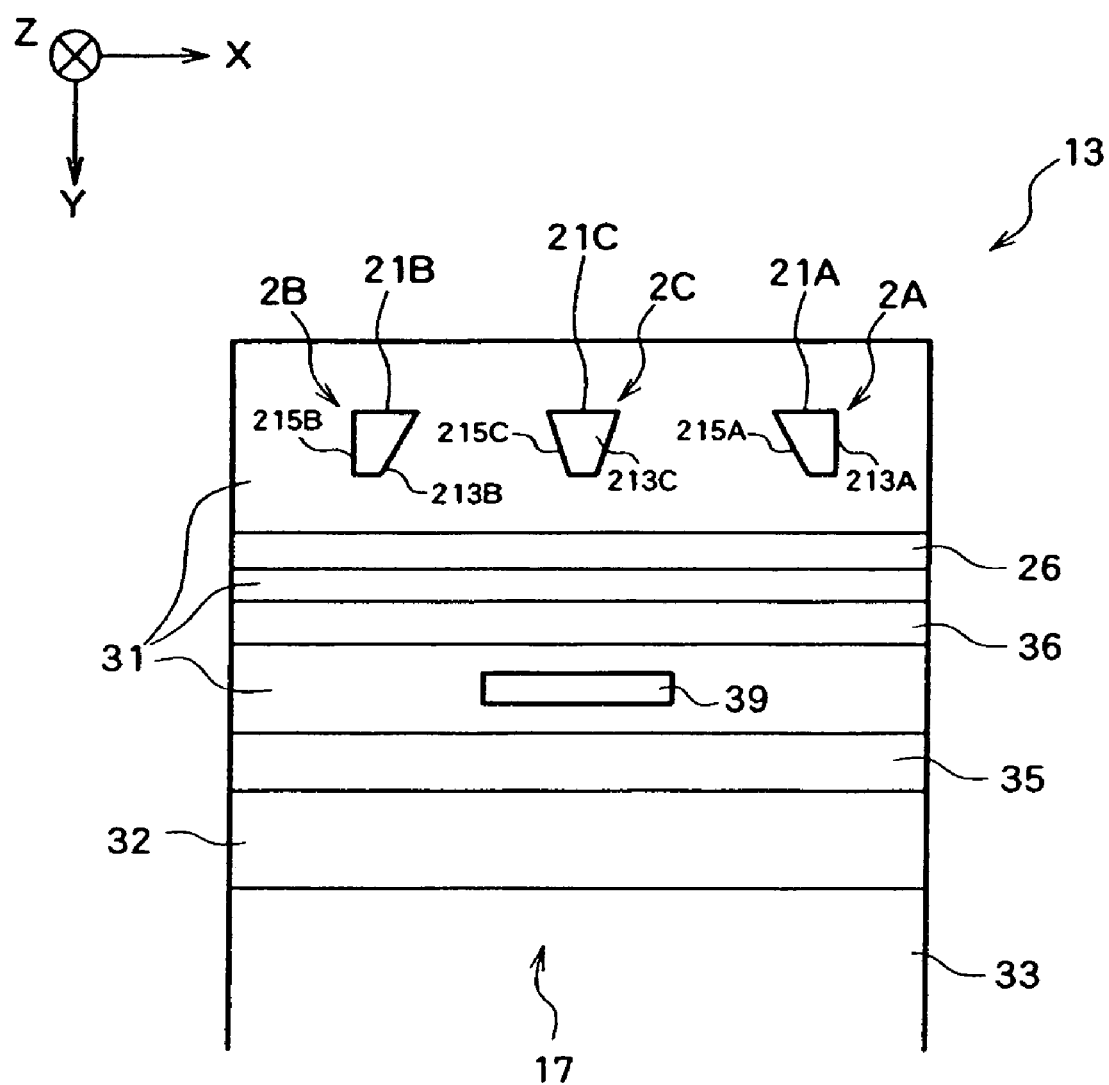
FIG. 10 is a diagram illustrating an air-bearing surface of a magnetic head according to a third embodiment.

A third embodiment of a magnetic head will now be described. FIG. 10 is a diagram illustrating an air-bearing surface 17 (which faces to a recording surface of a magnetic disc) of a magnetic head 13.

In the magnetic head 13, a return pole layer 26 is disposed on the read shield layer 36, and a first write element 2A, a second write element 2B, and a third write element 2C are provided on the same layer which is the return pole layer 26 (the write elements are arranged in the X direction). Here, an upper side is defined as a lamination direction in the layer structure, that is, the negative Y direction. The third write element 2C has the same configuration as the first write element 2A and the second write element 2B. It is possible to change positions of the first write element 2A, the second write element 2B, and the third write element 2C in the X direction. It is also possible to change positions of them in the Y direction.

Figure 11:
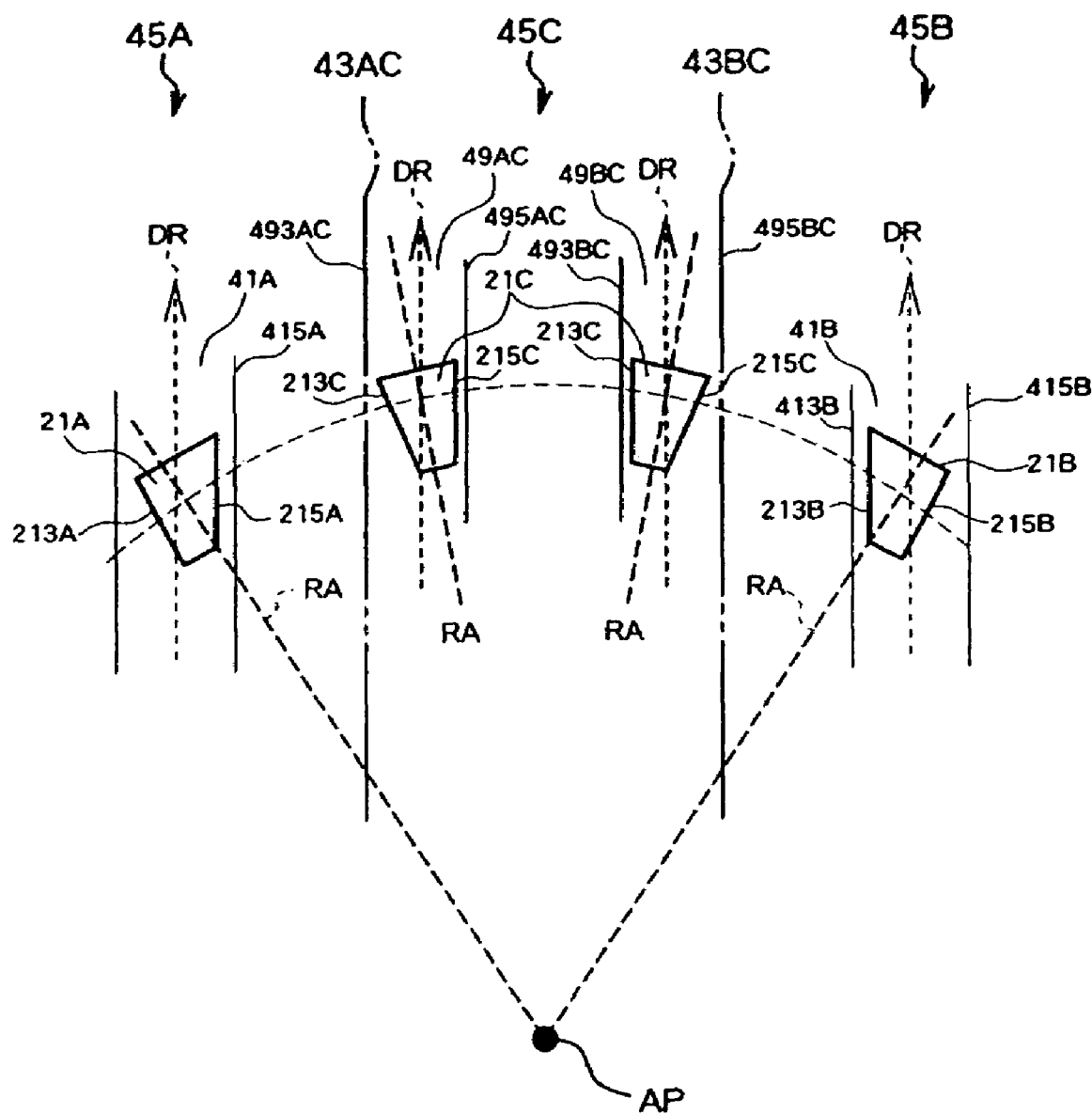
FIG. 11 is a diagram illustrating a relationship between a magnetic pole surface and a track when the magnetic head of the third embodiment is rotated on a recording surface of a magnetic disc.

FIG. 11 is a diagram illustrating a relationship between a magnetic pole surface and a track when the magnetic head 13 rotated on a recording surface of a magnetic disc 4. The drawing illustrates the projection area projecting the magnetic pole surface in a direction perpendicular to the recording surface of magnetic disc 4 (Z direction).

A third region 45C is defined as the region disposed between a first region 45A of an inner peripheral side and a second region 45B of an outer peripheral side. Specifically, the first region 45A, the third region 45C and the second region 45B are formed as ring shaped regions which are partitioned in concentric circle shapes by a boundary 43AC and a boundary 43BC. The third region 45C is a region including circumference based on a position where the magnetic head 13 does not form the skew angle. The third region 45C is a region having a smaller skew angle with respect to the first region 45A and the second region 45B.

In the magnetic head 13, the first write element 2A where the first magnetic pole surface 21A is exposed to the air-bearing surface 17 records data on the tracks included in the first region 45A. The third write element 2C where the third magnetic pole surface 21C is exposed to the air-bearing surface 17 records data on the tracks included in the third region 45C. The second write element 2B where the second magnetic pole surface 21B is exposed to the air-bearing surface 17 records data on the tracks included in the second region 45B.

FIG. 11 is a diagram illustrating a relationship between the tracks included in the first region 45A and the first magnetic pole surface 21A (a left side of the boundary 43AC), a relationship between the tracks included in the third region 45C and the third magnetic pole surface 21C (between the boundary 43AC and the boundary 43BC), and a relationship between the tracks included in the second region 45B and the second magnetic pole surface 21B (a right side of the boundary 43BC), when the magnetic head 13 is rotated on the recording surface of the magnetic disc 4.

The first magnetic pole surface 21A and the second magnetic pole surface 21B are the same configuration as the magnetic head 11 according to the aforementioned first embodiment. Specifically, the first magnetic pole surface 21A has a shape following a track edge 415A which is located on a side toward the boundary 43AC in the track 41A in the state where the first magnetic pole surface 21A is positioned on the innermost peripheral track 41A included in the first region 45A. The second magnetic pole surface 21B has a shape following a track edge 413B which is located on a side toward the boundary 43BC in the track 41B in the state where the second magnetic pole surface 21B is positioned on the outermost peripheral track 41B included in the second region 45B.

The third magnetic pole surface 21C has a shape following a track edge 493BC of an inner peripheral side in a track 49BC in the state where the third magnetic pole surface 21C is positioned on the outermost peripheral track 49BC included in the third region 45C. To clarify, a side 213C which is an inner peripheral side of the third magnetic pole surface 21C is formed in a shape following the track edge 493BC. Additionally, The third magnetic pole surface 21C has a shape following a track edge 495AC of an outer peripheral side in a track 49AC in the state where the third magnetic pole surface 21C is positioned on the innermost peripheral track 49AC included in the third region 45C. To clarify, a side 215C which is an outer peripheral side of the third magnetic pole surface 21C is formed in a shape following the track edge 495AC.

In this way, since the skew angle formed in the third region 45C is smaller than the skew angles of the first region 45A and the second region 45B, the third magnetic pole surface 21C can decrease a cut off region and sufficiently secure area thereof with respect to the first magnetic pole surface 21A and the second magnetic pole surface 21B. In detail, the cut off region of the inner peripheral side 213C in the third magnetic pole surface 21C is smaller than that of the inner peripheral side 213B in the second magnetic pole surface 21B. Additionally, the cut off region of the outer peripheral side 215C in the third magnetic pole surface 21C is smaller than that of the outer peripheral side 215A in the first magnetic pole surface 21A. Such correlations are the same as the relationship of the modified example illustrated in the FIGS. 7a and 7b as mentioned above, respectively.

Figure 12:
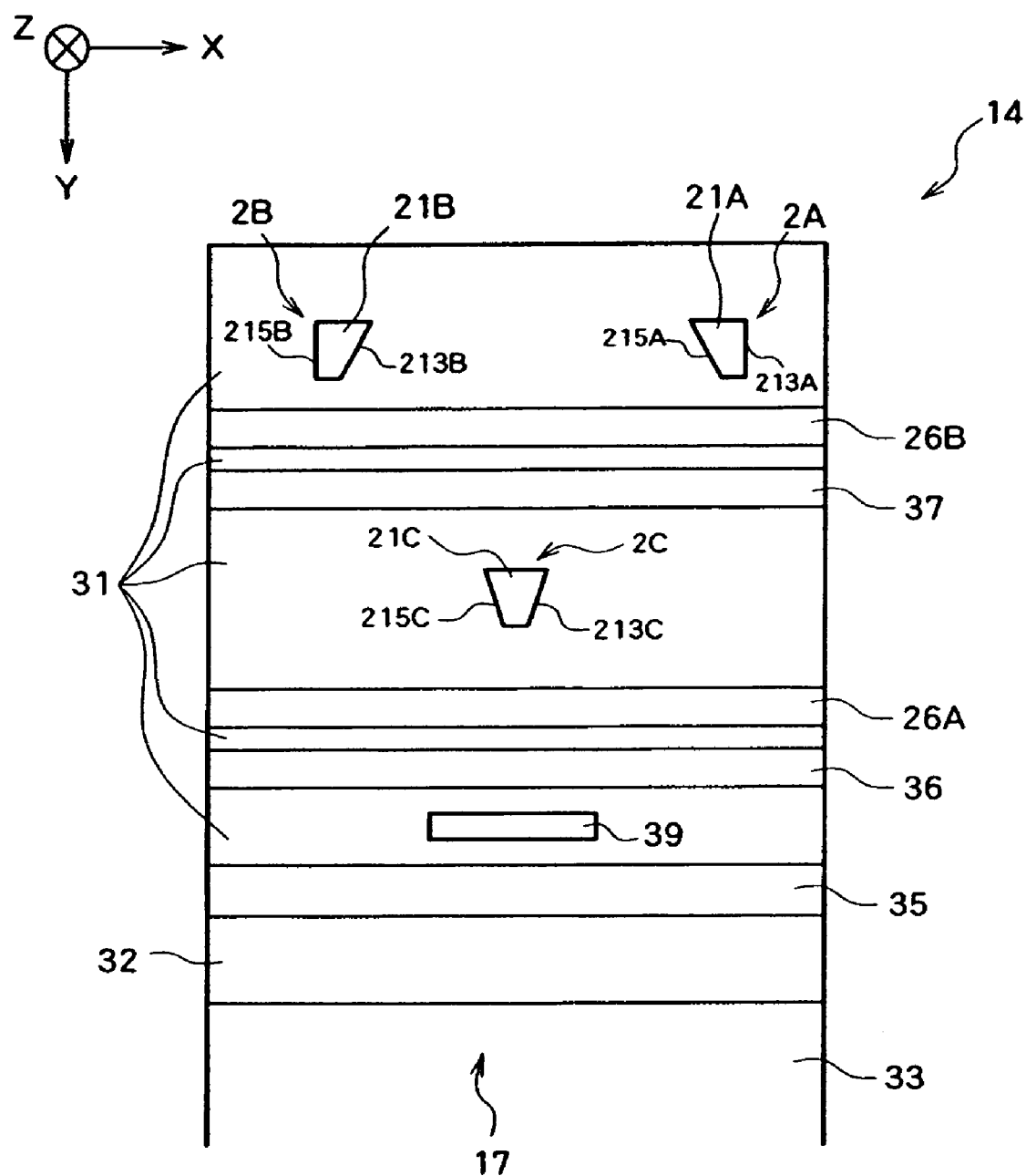
FIG. 12 is a diagram illustrating an air-bearing surface of a magnetic head according to a fourth embodiment.

A fourth embodiment of a magnetic head will now be described. FIG. 12 illustrates an air-bearing surface 17 (the surface faces to a recording surface of a magnetic disc) of a magnetic head 14.

In the magnetic head 14, a first write element 2A, a second write element 2B, and a third write element 2C are disposed on layers different from each other (the write elements are arranged in the Y direction). Here, an upper side is defined as a lamination direction in the layer structure, that is, the negative Y direction. On a read shield layer 36, a return pole layer 26A is disposed, and the third write element 2C is provided on the return pole layer 26A. A return pole layer 26B is also disposed thereon with the magnetic shield layer 37 interposed therebetween. The first write element 2A and the second write element 2B are provided on the return pole layer 26B. It is possible to change positions of the first write element 2A, the second write element 2B and the third write element 2C in the X direction and the Y direction.

In the magnetic head 14, the first magnetic pole surface 21A included in the first write element 2A, the second magnetic pole surface 21B included in the second write element 2B, and the third magnetic pole surface 21C included in the third write element 2C are formed in the same shape as the magnetic head 13 according to the third embodiment as shown in FIG. 12 mentioned above.

In FIG. 11, since the first write element 2A, second write element 2B, and the third write element 2C are disposed on the different layers (the write elements are arranged in the Y direction), the first magnetic pole surface 21A, the second magnetic pole surface 21B, and the third magnetic pole surface 21C are formed to have a difference corresponding to a gap of the layers to the position of the rotational radius direction RA.

Figure 13:
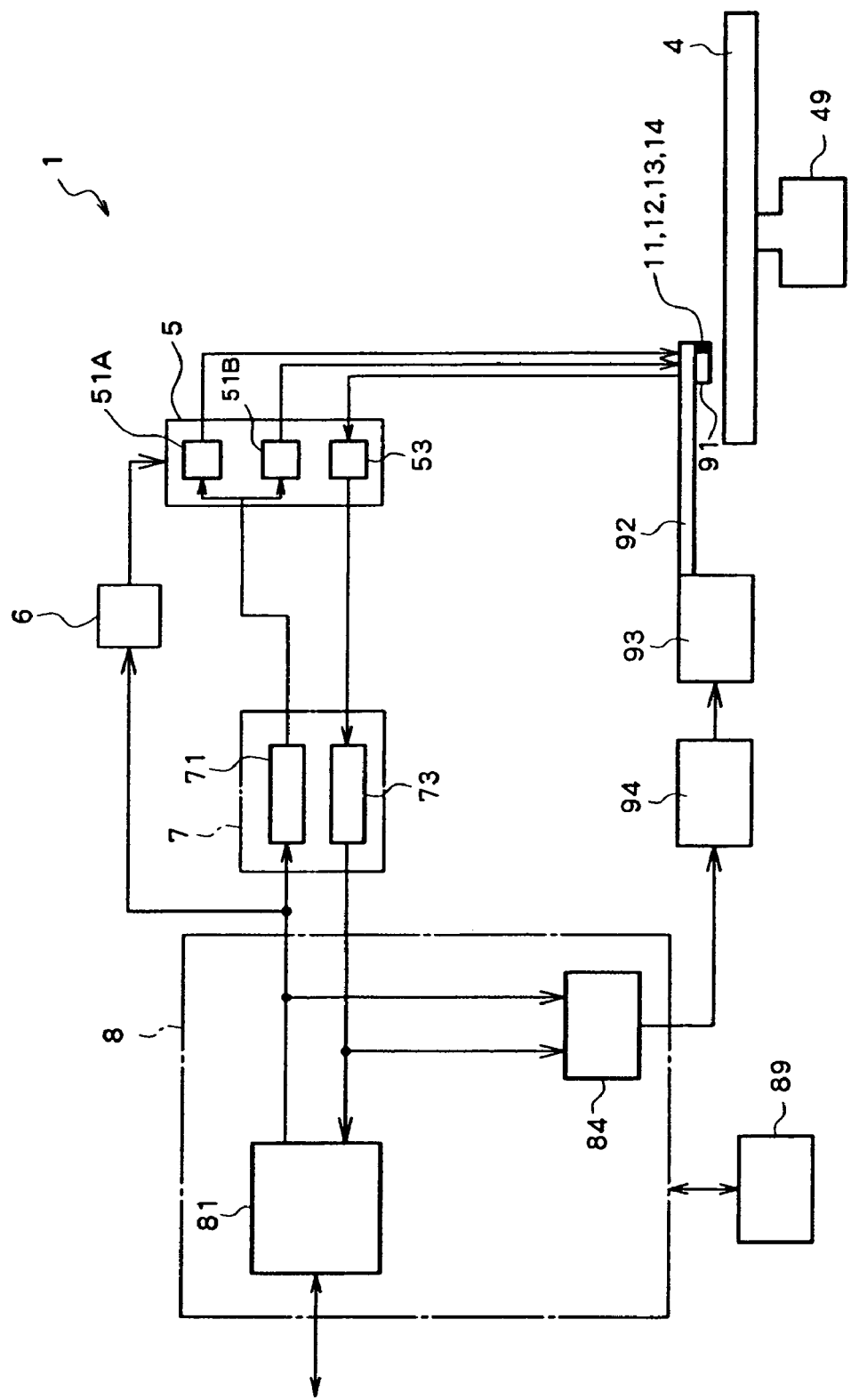
FIG. 13 is a block diagram illustrating a configuration of a magnetic disc drive.

It will be described about an embodiment of a magnetic disc drive using the aforementioned magnetic head. FIG. 13 is a block diagram illustrating a configuration of the magnetic disc drive 1. The magnetic disc drive 1 includes a magnetic disc 4, a spindle motor 49, a head amplifier 5, an output switch 6, read/write channel 7 (R/W channel), an MPU integrated circuit/hard disk controller 8 (MPU/HDC), a memory 89, a slider 91 equipped with the aforementioned magnetic head 11 (or any one of 12 to 14), a head assembly 92 as a supporting member, a voice coil motor 93 as an actuator, and a driver 94.

The magnetic disc 4 is provided with a servo data region where servo data (position data) is recorded and a user data region where user data is recorded on the recording surface. The magnetic disc 4 corresponds to the perpendicular magnetic recording system. In the embodiment, an example of one magnetic disc 4 of which only one side is formed as the recording surface is illustrated. However, the embodiment is not limited to this, it is possible to provide the recording region on both sides thereof and it is also possible to prepare the plurality of magnetic discs 4. Additionally, the magnetic disc 4 is span by the spindle motor 49.

The head amplifier 5 includes a first write channel 51A, a second write channel 51B, and a read channel 53. The first write channel 51A and the second write channel 51B give outputs of electrical signals for recording generated by data received from the R/W channel 7 to the first write element 2A (refer to FIGS. 1 to 3) of the magnetic head 11. Here, choosing one of the first write channel 51A and second write channel 51B by the output switch 6 gives the outputs of the electrical signals for a recording. Meanwhile, the read channel 53 receives the electric signals reproduced by the read element 39 (refer to FIGS. 1 to 3) of the magnetic head 11, amplifies the signals, and then gives the outputs to the R/W channel 7.

The output switch 6 switches over the write channels 51A and 51B outputting the electrical signals for the recording by receiving information about whether the recording position of data is located on the first region 45A or the second region 45B, from the MPU/HDC 8. Specifically, in the case where the recording position of the data is the first region 45A, the switch outputs a channel selection signal to the head amplifier 5 so as to select the first write channel 51A. On the other hand, in the case where the recording position of the data is the second region 45B, the switch outputs the channel selection signal to the head amplifier 5 so as to select the second write channel 51B. As the result, in the case where the recording position of the data is the first region 45A, the recording is performed by the first write element 2A. Conversely, in the case where the recording position of the data is the second region 45B, the recording is performed by the second write element 2B.

The first write channel 51A and the second write channel 51B are configured so that the other channel which is not selected outputs low-power electrical signals which have an inverted phase with respect to the electrical signals for the recording when one channel which is selected by the output switch 6 outputs the electrical signals for the recording. Due to this, in the magnetic head 11, though the record magnetic field generated from a coil which is included in one write element of the first write element 2A and the second write element 2B acts on a coil which is included in the other write element, a magnetic field in a direction canceling the acted record magnetic field is also generated from the coil included in the other write element. Therefore, the other write element can prevent generating the residual magnetic field.

In the case where three write elements 2A to 2C exist as the aforementioned magnetic heads 13 and 14, the recording channels included in the head amplifier 5 are provided to correspond to the write elements 2A to 2C, respectively. The output switch 6 switches over output terminals by receiving information about which of regions 45A to 45C the recording position of the data is located on, from the MPU/HDC 8.

The R/W channel 7 includes a code modulation circuit 71 (signal generating circuit), and a code demodulation circuit 73. At the time of recording the data, the code modulation circuit 71 gives an output encoding target record data which is received from the MPU/HDC 8 to the head amplifier 5. The code demodulation circuit 73 gives an output decoding the electrical signals reproduced from the read channel 53 of the head amplifier 5 to the MPU/HDC 8.

The slider 91 has the magnetic head 11 attached thereto and moves over the recording surface in a flying manner by spin of the magnetic disc 4. The head assembly 92 supports the slider 91. The voice coil motor 93 acts driving power on the head assembly 92, and approximately rotates the magnetic head 11 along the radius direction of the magnetic disc 4. The driver 94 drives the voice coil motor 93 by receiving control signals from the MPU/HDC 8.

The MPU/HDC 8 is responsible for the entire operations of the magnetic disc drive 1, and controls a seek control of the magnetic head 11, a positioning control, an interface control between an external host and the like. The memory 89 includes a ROM storing a program and data required to operate the MPU/HDC 8, and a RAM operating as a work memory of MPU/HDC 8.

Figure 14:
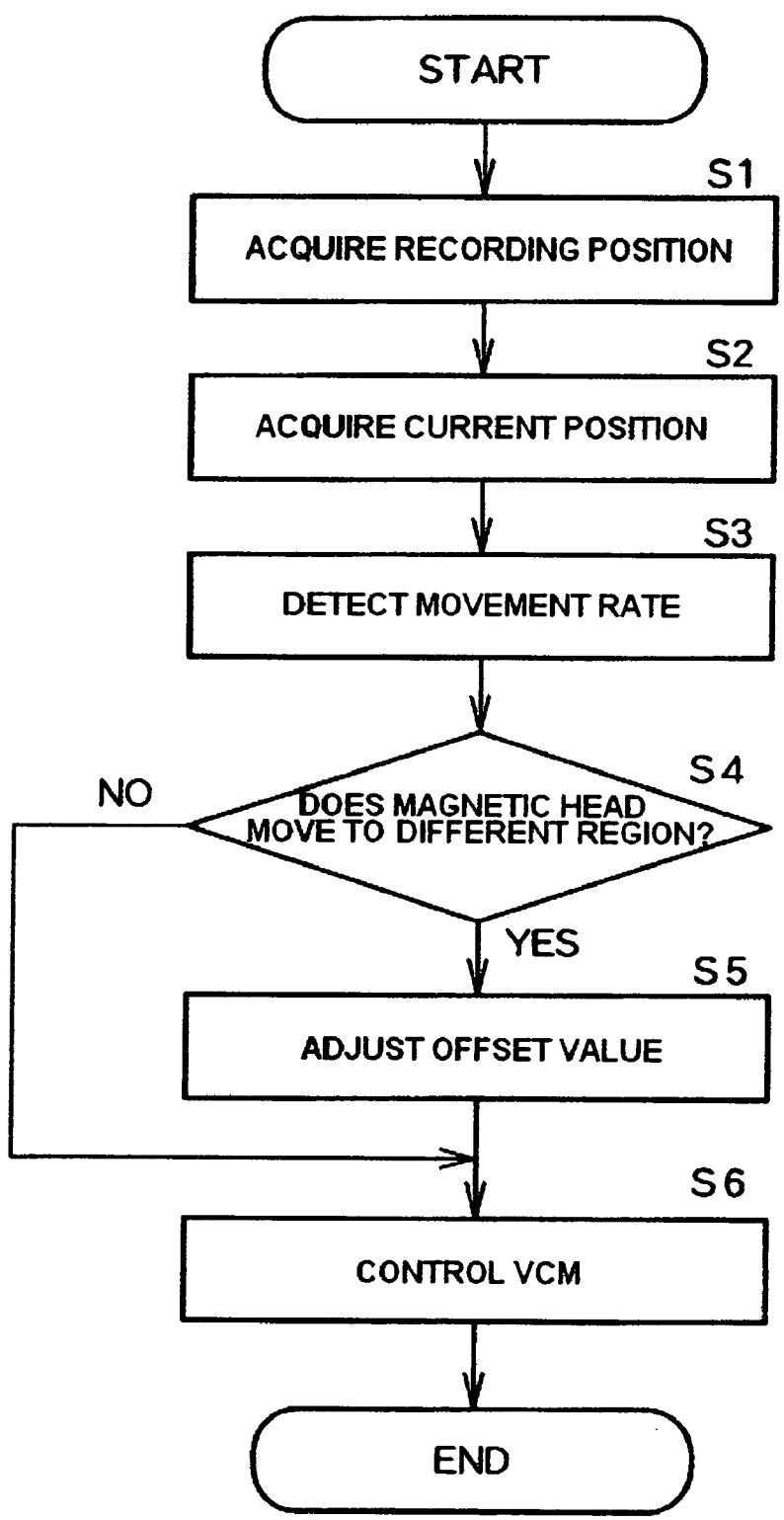
FIG. 14 is a flowchart illustrating an operation performed by a MPU/HDC of the magnetic disc drive.
Figure 15:
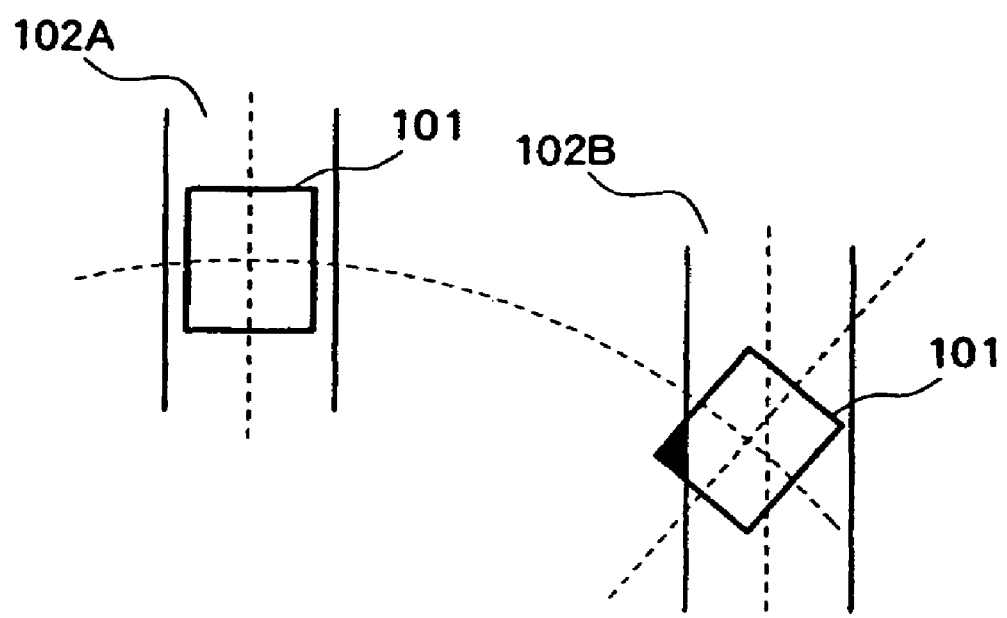
FIG. 15 is a diagram illustrating a state of a magnetic pole surface disposed on a track which is formed on a recording surface according to a conventional example.

The MPU/HDC 8 has an interface section 81 and a control section 84 in the functional respect. These components are realized by the software operation of the MPU/HDC 8. The respective components can be mounted by using hardware other than the MPU/HDC 8. FIG. 14 is a flowchart illustrating an operation of the MPU/HDC 8.

The interface section 81 transmits and receives data between the external host, outputs the target record data received from the external host to the R/W channel 7, and transmits the reproducing data received from the R/W channel 7 to the external host. Additionally, the interface section 81 outputs the recording position of the target record data received from the external host to the control section 84 and the output switch 6.

The control section 84 acquires the recording position of data from the interface section 81 (step S1). Additionally, the control section 84 extracts the servo data (the position data) by receiving the reproducing data from the R/W channel 7, and acquires the position of the magnetic head 11 on the recording surface of the magnetic disc 4 (step S2). When the control section 84 acquires the recording position of the data and the current position of the magnetic head, the control section calculates a movement rate for moving the magnetic head 11 on the basis of the differentiation between them, and generates the control signal of the voice coil motor 93 (step S3).

In the case where a region on the recording surface including the recording position of data and a region on the recording surface including a current position of the magnetic head are different from each other, that is, in the case where a position of the magnetic head 11 is changed between the first region 45A and the second region 45B (step S4: YES), the control section 84 adds or subtracts an offset value correcting an inclination in a track width direction caused by a position difference of the first magnetic pole surface 21A and the second magnetic pole surface 21B in the magnetic head 11 to or from a control signal (step S5).

As shown in FIG. 1, since positions between the first magnetic pole surface 21A and the second magnetic pole surface 21B which are exposed to the air-bearing surface 17 of the magnetic head 11 are different from each other, when the write elements 2A and 2B for a recording are switched, there is a concern with an inclination between the magnetic pole surfaces 21A and 21B and the tracks which are positioned. However, the offset value is added or subtracted to or from the control signal as mentioned above, and thus it is possible to perform positioning on the tracks of the magnetic pole surfaces 21A and 21B in an effective manner.

Then, the control section 84 outputs the control signal to the driver 94 and controls the voice coil motor 93 (step S5).

In the step S4, it is judged whether the offset value is adjusted or not, by comparing a region including the recording position of data on the recording surface and a region including the current position of the magnetic head on the recording surface. However, the embodiment is not limited to this, it is also allowed to adjusting the offset value by judging whether the recording position of data obtained from the interface section 81 in the step SI belongs to the first region 45A or the second region 45B.

What is claimed is:

1. A magnetic head which moves over a recording surface of a magnetic disc in a flying manner, rotates about a rotation axis defined outside the magnetic disc, and records data onto the recording surface along tracks formed on the recording surface, the magnetic head comprising:
   a first write element formed in such a shape that a projection area of a magnetic pole surface which is opposed to the recording surface so as to emit a record magnetic field onto the recording surface does not cross over both track edges of the track included in a first region among the first region and a second region partitioned concentrically on the recording surface in the state where the first write element is positioned on the track included in the first region; and
   a second write element formed in such a shape that a projection area of a magnetic pole surface which is opposed to the recording surface so as to emit a record magnetic field onto the recording surface does not cross over both track edges of the track included in the second region in the state where the second write element is positioned on the track included in the second region.

2. The magnetic head according to claim 1, wherein on the recording surface, an inner peripheral side of a track which forms a skew angle of zero along with the magnetic head in the recording surface is defined as the first region and an outer peripheral side of the track is defined as the second region.

3. The magnetic head according to claim 1,
   wherein the recording surface further includes a third region in addition to the first region and the second region, and
   wherein the magnetic head further includes a third write element formed in such a shape that a projection area of a magnetic pole surface which is opposed to the recording surface so as to emit a record magnetic field onto the recording surface does not cross over both track edges of the track included in the third region in the state where the third write element is positioned on the track included in the third region.

4. A magnetic disc drive comprising:
   a magnetic head which moves over a recording surface of a magnetic disc in a flying manner, rotates about a rotation axis defined outside the magnetic disc, and records data onto the recording surface along tracks formed on the recording surface, the magnetic head comprising,
      a first write element formed in such a shape that a projection area of a magnetic pole surface which is opposed to the recording surface so as to emit a record magnetic field onto the recording surface does not cross over both track edges of the track included in a first region among the first region and a second region partitioned concentrically on the recording surface in the state where the first write element is positioned on the track included in the first region, and
      a second write element formed in such a shape that a projection area of a magnetic pole surface which is opposed to the recording surface so as to emit a record magnetic field onto the recording surface does not cross over both track edges of the track included in the second region in the state where the second write element is positioned on the track included in the second region;
   the magnetic disc;
   a control circuit for moving the magnetic head to a target record position of data on the recording surface of the magnetic disc; and
   an output switch circuit outputting a signal for recording data to the first write element when the target record position is in the first region and outputting a signal for recording data to the second write element when the target record position is in the second region.

5. The magnetic disc drive according to claim 4, wherein when outputting a signal for recording data to one write element of the first write element and the second write element, the output switch circuit outputs to the other write element a signal for generating a magnetic field in a direction of canceling a magnetic field which is generated from a coil included in the one write element and acts on a coil included in the other write element.

6. The magnetic disc drive according to claim 4, wherein when a position of the magnetic head is changed between the first region and the second region, the control circuit adds or subtracts an offset value for correcting an inclination in the track width direction due to a position difference between a magnetic pole surface of the first write element and a magnetic pole surface of the second write element; to or from a control signal for moving the magnetic head.

7. A magnetic disc drive comprising:
a magnetic head which moves over a recording surface of a magnetic disc in a flying manner, rotates about a rotation axis defined outside the magnetic disc, and records data onto the recording surface along tracks formed on the recording surface, the magnetic head comprising,
a first write element formed in such a shape that a projection area of a magnetic pole surface which is opposed to the recording surface so as to emit a record magnetic field onto the recording surface does not cross over both track edges of the track included in a first region among the first region and a second region partitioned concentrically on the recording surface in the state where the first write element is positioned on the track included in the first region,
a second write element formed in such a shape that a projection area of a magnetic pole surface which is opposed to the recording surface so as to emit a record magnetic field onto the recording surface does not cross over both track edges of the track included in the second region in the state where the second write element is positioned on the track included in the second region, and
wherein on the recording surface, an inner peripheral side of a track which forms a skew angle of zero along with the magnetic head in the recording surface is defined as the first region and an outer peripheral side of the track is defined as the second region;
the magnetic disc;
a control circuit for moving the magnetic head to a target record position of data on the recording surface of the magnetic disc; and
an output switch circuit outputting a signal for recording data to the first write element when the target record position is in the first region and outputting a signal for recording data to the second write element when the target record position is in the second region.

8. The magnetic disc drive according to claim 7, wherein when outputting a signal for recording data to one write element of the first write element and the second write element, the output switch circuit outputs to the other write element a signal for generating a magnetic field in a direction of canceling a magnetic field which is generated from a coil included in the one write element and acts on a coil included in the other write element.

9. The magnetic disc drive according to claim 7, wherein when a position of the magnetic head is changed between the first region and the second region, the control circuit adds or subtracts an offset value for correcting an inclination in the track width direction due to a position difference between a magnetic pole surface of the first write element and a magnetic pole surface of the second write element, to or from a control signal for moving the magnetic head.

10. A magnetic disc drive comprising:
a magnetic head which moves over a recording surface of a magnetic disc in a flying manner, rotates about a rotation axis defined outside the magnetic disc, and records data onto the recording surface along tracks formed on the recording surface, the magnetic head comprising,
a first write element formed in such a shape that a projection area of a magnetic pole surface which is opposed to the recording surface so as to emit a record magnetic field onto the recording surface does not cross over both track edges of the track included in a first region among the first region and a second region partitioned concentrically on the recording surface in the state where the first write element is positioned on the track included in the first region,
a second write element formed in such a shape that a projection area of a magnetic pole surface which is opposed to the recording surface so as to emit a record magnetic field onto the recording surface does not cross over both track edges of the track included in the second region in the state where the second write element is positioned on the track included in the second region,
wherein the recording surface further includes a third region in addition to the first region and the second region, and
wherein the magnetic head further includes a third write element formed in such a shape that a projection area of a magnetic pole surface which is opposed to the recording surface so as to emit a record magnetic field onto the recording surface does not cross over both track edges of the track included in the third region in the state where the third write element is positioned on the track included in the third region;
the magnetic disc;
a control circuit for moving the magnetic head to a target record position of data on the recording surface of the magnetic disc; and
an output switch circuit outputting a signal for recording data to the first write element when the target record position is in the first region and outputting a signal for recording data to the second write element when the target record position is in the second region.

11. The magnetic disc drive according to claim 10, wherein when outputting a signal for recording data to one write element of the first write element and the second write element, the output switch circuit outputs to the other write element a signal for generating a magnetic field in a direction of canceling a magnetic field which is generated from a coil included in the one write element and acts on a coil included in the other write element.

12. The magnetic disc drive according to claim 10, wherein when a position of the magnetic head is changed between the first region and the second region, the control circuit adds or subtracts an offset value for correcting an inclination in the track width direction due to a position difference between a magnetic pole surface of the first write element and a magnetic pole surface of the second write element, to or from a control signal for moving the magnetic head.

* * * * *